March 8, 1949.  M. A. TRISLER  2,463,828
ENGINE FUEL SYSTEM OR OTHER FLUID TRANSFER SYSTEMS
Filed Oct. 21, 1943
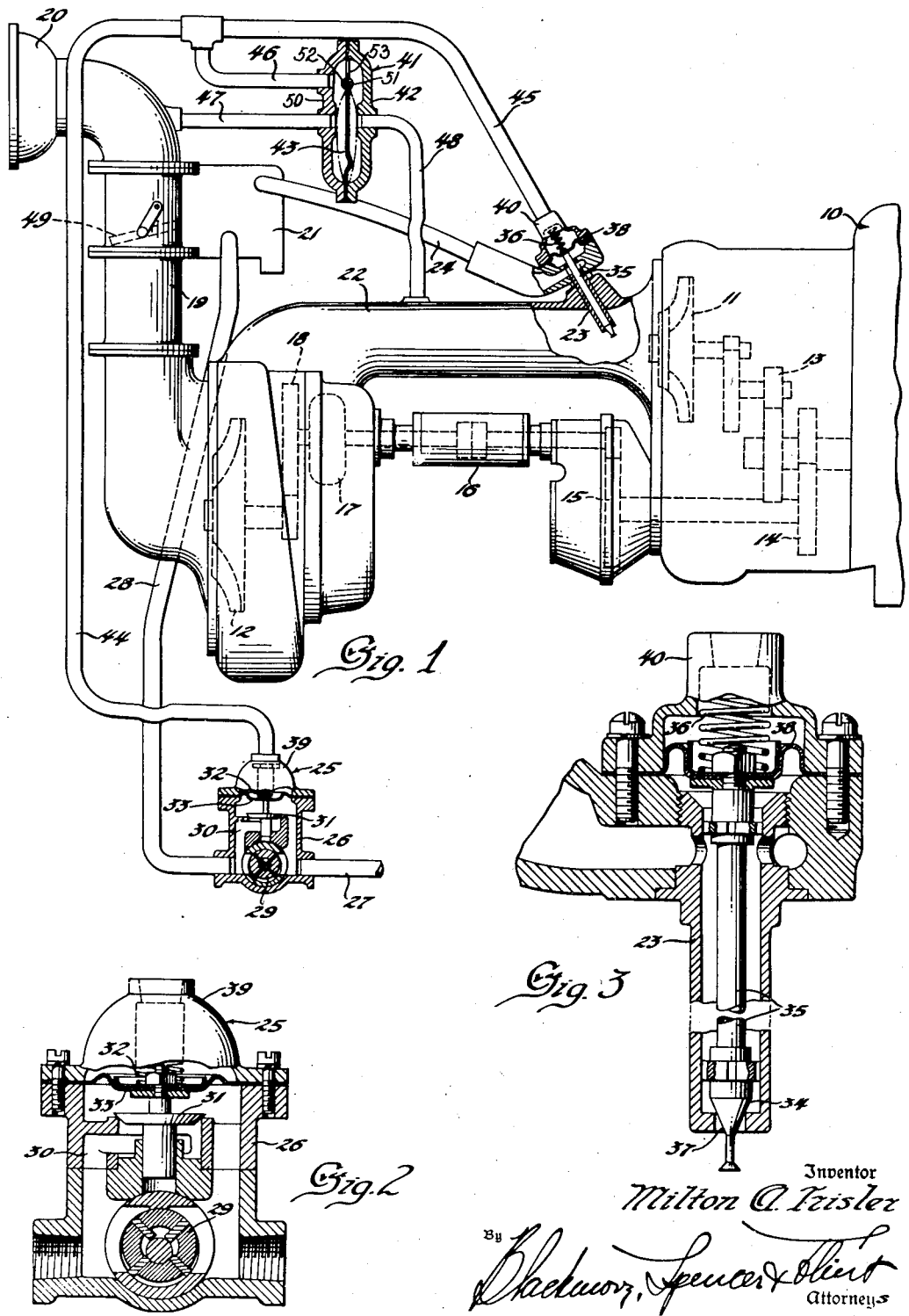
Inventor
Milton A. Trisler
By
Attorneys Patented Mar. 8, 1949

2,463,828

UNITED STATES PATENT OFFICE 2,463,828

ENGINE FUEL SYSTEM OR OTHER FLUID TRANSFER SYSTEMS

Milton A. Trisler, Indianapolis, Ind., assignor to General Motors Corporation, Detroit, Mich., a corporation of Delaware Application October 21, 1943, Serial No. 507,096

19 Claims. (Cl. 123—119)

This invention has to do with fluid transfer systems, more particularly fluid transfer systems which operate under varying conditions of ambient pressure, such as fuel systems for airplane internal combustion engines which operate under varying conditions of atmospheric pressure.

The principal object of the invention is to provide a fluid transfer system in which the effect of changes in the ambient pressure on the pressure and/or the rate of flow of the fluid in the system is minimized.

More specifically, the invention has to do with fluid transfer systems in which there is a member through which the pressure and/or rate of flow of the fluid in the system is affected by pressure external to the system and has for its object to provide means for minimizing the effect of variations in the ambient pressure on the member and thus for minimizing the effect of variations in the ambient pressure on the pressure and/or rate of flow of fluid in the system.

The invention is particularly applicable to carbureting apparatus for engines of the class mentioned in which the fuel is injected into a stream of air whose pressure is at times lower and at times higher than that of the atmosphere by a by-pass type fuel pump through a metering device and a nozzle which is opened by the pressure of the fuel.

In its application to carbureting apparatus of the type described, the principal object of the invention is to provide carbureting apparatus in which the pressure of the fuel at the nozzle is at all speeds of the engine under all conditions of atmospheric pressure maintained sufficiently high and uniform to inject the fuel into the stream of air at the desired rate.

For a better understanding of the objects and nature of this invention reference is made to the following specification and the accompanying drawing wherein there is described and illustrated the preferred embodiment of the invention.

In the accompanying drawing:

Figure 1 is a more or less diagrammatic view of carbureting apparatus of the type described in which my invention is embodied installed on an internal combustion airplane engine.

Figure 2 is an enlarged view of the fuel pump included in the carbureting apparatus.

Figure 3 is an enlarged view of the fuel nozzle included in the carbureting apparatus.

In the drawing the reference character 10 indicates an internal combustion engine with a main centrifugal supercharger which includes an impeller 11 and an auxiliary centrifugal supercharger which includes an impeller 12. The impeller 11 of the main supercharger is driven from the crankshaft of the engine at a speed proportionate to the speed of the engine through gearing which is indicated generally by the reference character 13. The impeller 12 of the auxiliary supercharger is driven from the crankshaft of the engine at a speed which varies with respect to the speed of the engine through elements of the gearing 13, a gear 14, gearing 15, a universal joint 16, a fluid coupling 17 and gearing 18.

From a point at which air is forced into it by movement of the airplane to the intake side of the auxiliary supercharger there extends a duct 19 to whose outer end there is connected a scoop 20 which faces in the direction of movement of the airplane. In the duct 19 between the scoop 20 and the auxiliary supercharger there is interposed a device 21, such as is used in the Stromberg injection carburetor, which meters fuel at a rate which bears the desired relation to the rate of flow of air through the duct. To regulate the rate of flow of air through the duct and, thus, the speed of the engine 10, there is incorporated in the fuel metering device a butterfly type throttle valve 49. From the discharge side of the auxiliary supercharger to the intake side of the main supercharger extends a duct 22 into which projects immediately in advance of the impeller 11 of the main supercharger a fuel nozzle 23 which is connected to the fuel metering device 21 by a tube 24.

To advance fuel to the metering device 21 and, thence, to the fuel nozzle 23 through the tube 24 there is provided a fuel pump 25. The fuel pump 25 includes a body 26 with a fuel intake opening connected to the fuel tank of the airplane by a pipe 27 and a fuel discharge opening connected to the metering device by a pipe 28 and an impeller 29 driven by the engine at a speed proportionate to the speed of the engine 10 to draw fuel into the intake opening and discharge it from the discharge opening. In the body 26 of the fuel pump there is provided a by-pass 30 through which fuel may return from the discharge opening to the intake opening and in this by-pass a valve 31. The valve 31 is urged to position to close the by-pass by a spring 32 and connected to a flexible diaphragm 33 whose inner side is exposed to the pressure of the fuel in the by-pass so that the valve will open when and remain open as long as the pressure of the fuel at the discharge opening of the pump exceeds the pressure to which the outer side of the diaphragm is exposed by a selected amount to the end of maintaining constant the pressure at which fuel is discharged from the pump.

To regulate the discharge of fuel from the nozzle 23 there is provided within the nozzle a conical valve 34 with a stem 35 which is urged by a spring 36 to the position in which it closes the discharge orifice 37 in the nozzle and connected to a flexible diaphragm 38 whose inner side is exposed to the pressure of the fuel in the nozzle so that the valve will open and fuel will be injected into the duct 22 when the pressure of the fuel in the nozzle exceeds the pressure to which the outer side of the diaphragm is exposed by a certain amount and the valve will remain open and fuel will continue to be injected into the duct 22 as long as the difference in pressures exceeds this amount.

When the engine 10 is operating, air enters the scoop 20 and passes therefrom through the duct 19, the metering device 21 and the auxiliary supercharger into the duct 22. Fuel is injected through the nozzle 23 into the air in the duct 22 and with it passes through the main supercharger into the cylinders of the engine.

To insure injection of fuel into the duct 22 in the form of a spray which will readily be entrained by the air in the duct, it is, of course, necessary to maintain the pressure of the fuel within the fuel nozzle 23 at a valve well above that of the air in the duct 22 and the effective area of the orifice 37 in the fuel nozzle below a value which varies with the rate at which fuel is delivered to the fuel nozzle. To insure these things, it is necessary that the pressure at which fuel is discharged from the fuel pump 25 be maintained above a certain value and the valve 34 in the fuel nozzle be prevented from opening too far. To do these things it is necessary to prevent the pressure on the outer sides of the diaphragms 33 and 38 of the fuel pump and the fuel nozzle falling below a selected value and to insure injection of fuel into the duct 22 at a rate which bears the desired relation to the rate of flow of air to the engine and in the most desirable form it is preferable to maintain the pressure on the outer sides of the diaphragms constant.

Through the fluid coupling 17 the rate at which the impeller 12 of the auxiliary supercharger is driven is so regulated that the pressure in the duct 22 is maintained at about that of the atmosphere at sea level under all conditions of atmospheric pressure which obtain up to a selected altitude except when the engine is operating at low speeds when it is impracticable so to regulate it. At altitudes greater than the selected altitude within the range within which the engine 10 is intended to operate the rate at which the impeller of the auxiliary supercharger is driven is, through the fluid coupling, so regulated that the pressure in the duct 22 is, except, of course, when the engine is operating at low speeds, maintained at a value which while lower than that at which it is maintained up to the selected altitude is still higher than that of the surrounding atmosphere. The pressure in the duct 22 is, consequently, at times higher and at times lower than the pressure of the surrounding atmosphere.

To maintain the pressure on the outer sides of the diaphragms 33 and 38 of the fuel pump and fuel nozzle as nearly constant as possible at all speeds of the engine 10 under all conditions of atmospheric pressure, there is provided on the fuel pump a cover 39 for the diaphragm 33 and on the fuel nozzle a cover 40 for the diaphragm 38. The interiors of these covers are connected to the interiors of the scoop 20 and the duct 22 through a valve so constructed that the higher of the pressures of the air in the scoop and the air in the duct 22 is applied to the outer sides of the diaphragms 33 and 38. The valve referred to is indicated in the drawing by the reference character 41. It includes a hollow body which consists of dished members 42 and 50 between whose margins and between bars 51 and 52 which extend across the dished members near one side is clamped a flexible diaphragm 43 with an aperture 53 in it between the margins of the dished members and the bars. The connections between the interiors of the covers 39 and 40 and the interiors of the scoop 20 and the duct 22 which were mentioned are afforded by pipes 44, 45, 46, 47 and 48. The pipes 44 and 45 are connected, respectively, to the interior of the cover 39 and the interior of the cover 40. The pipe 46 is connected to the pipes 44 and 45 and to the interior of the body of the valve 41 near the aperture 53 in the flexible diaphragm 43 so that it communicates with it on both sides of the diaphragm. The pipe 47 is connected to the interior of the scoop and to the interior of the body of the valve 41 on one side and the pipe 48 is connected to the interior of the duct 22 and to the interior of the body of the valve 41 on the other side of the imperforate portion of the diaphragm 43.

This arrangement insures that the outer sides of the diaphragms 33 and 38 will always be subjected to the higher of the pressures of the air in the scoop 20 and of the air in the duct 22 and, consequently, that the pressure on the outer sides of the diaphragms will be maintained as nearly constant as possible at all speeds of the engine under all conditions of atmospheric pressure. If the pressure of the air in the scoop becomes higher than the pressure of the air in the duct 22, the diaphragm 43 will flop over to a position in which it blocks communication between the duct 22 and the interior of the body of the valve and, consequently, as long as this condition obtains the outer sides of the diaphragms 33 and 38 will be subjected to the pressure of the air in the scoop. If the pressure of the air in the duct 22 becomes higher than the pressure of the air in the scoop, the diaphragm will flop over to a position in which it blocks communication between the scoop and the interior of the body of the valve and, consequently, as long as this condition obtains the outer sides of the diaphragms 33 and 38 will be subjected to the pressure of the air in the duct 22. The condition first mentioned obtains, as I have indicated, only when the engine is operating at low speeds.

The arrangement which has been disclosed is not limited to use in conjunction with the particular carbureting apparatus which has been illustrated and described. It can also be used in conjunction with carbureting apparatus which includes one or more superchargers on whose engine side or sides the fuel is injected. It can also be used in conjunction with carbureting apparatus which includes one or more superchargers on whose atmospheric side or sides the fuel is injected but in the case of carbureting apparatus of this type it is not so important to apply the arrangement to the fuel nozzle. In the case of carbureting apparatus which includes a fuel pump of other than the by-pass type the arrangement may be applied to the fuel nozzle only.

Although I have illustrated and described my invention applied in a particular manner to a particular type of fuel supply system for a particular type of internal combustion airplane engine carbureting apparatus and have pointed out that it may be applied to other types of fuel supply systems for other types of carbureting apparatus, it is to be understood that the invention may also be applied to fluid transfer systems other than fuel supply systems for carbureting apparatus.

I claim:

1. In carbureting apparatus for internal combustion engines, a duct, a pump driven at a speed which is variable with respect to the speed of the engine for moving air through the duct toward the engine, a pump driven at a speed proportionate to the speed of the engine for moving air from the duct on the engine side of the first specified pump toward the engine, means for metering fuel in accordance with the flow of air through the duct interposed in the duct on the atmospheric side of the first specified pump, a pump with a by-pass through which fuel may return from the discharge side to the intake side of the impeller of the third specified pump for advancing fuel into the duct between the first specified pump and the second specified pump, a valve movable toward and away from a position in which it obstructs the passage of fuel through the by-pass, means through which the pressure of fluid external to the third specified pump urges the valve toward the position in which it obstructs the passage of fuel through the by-pass, means, including an orifice, through which fuel is introduced into the duct between the first specified pump and the second specified pump, a valve which is movable toward and away from a position in which it obstructs passage of fuel through the orifice, means through which the pressure of the fuel advanced by the third specified pump urges the second specified valve away from and the pressure of fluid external to the second specified valve moves the second specified valve toward the position in which it obstructs passage of fuel through the orifice, and means for transmitting to the second and fourth specified means the higher of the pressure of the atmosphere and the pressure of the fluid in the duct between the first specified pump and the second specified pump, including a valve which communicates with the atmosphere and with the duct between the first specified pump and the second specified pump and includes a member movable by the difference between the last mentioned pressures to a position in which it blocks communication between the atmosphere or the duct and the third specified valve.

2. In carbureting apparatus for internal combustion engines, a duct, a pump for moving air through the duct toward the engine, a pump with a by-pass through which fuel may return from the discharge side to the intake side of the impeller of the second specified pump for advancing fuel into the duct, a valve which is movable toward and away from a position in which it obstructs the passage of fuel through the by-pass, means through which the pressure of fluid external to the second specified pump urges the valve toward the position in which it obstructs the passage of fuel through the by-pass, means, including an orifice, through which fuel is advanced by the second specified pump to the duct, a valve which is movable toward and away from a position in which it obstructs the passage of fuel through the orifice, means through which the pressure of the fuel advanced by the second specified pump urges the second specified valve away from and the pressure of fluid external to the second specified valve moves the second specified valve toward the position in which it obstructs passage of fuel through the orifice, and means for transmitting to the first and third specified means the pressure of the fluid in the duct on the engine side of the first specified pump.

3. In carbureting apparatus for internal combustion engines, a duct, a pump for moving air through the duct toward the engine, a pump with a by-pass through which fuel may return from the discharge to the intake side of the impeller of the second specified pump for advancing fuel to the engine, a valve which is movable toward and away from a position in which it obstructs the passage of fuel through the by-pass, means through which the pressure of fluid external to the second specified pump urges the valve toward the position in which it obstructs the passage of fuel through the by-pass, means, including an orifice, through which fuel is advanced by the pump to the engine, a valve which is movable toward and away from a position in which it obstructs the passage of fuel through the orifice, means through which the pressure of the fuel advanced by the second specified pump urges the second specified valve away from and the pressure of fluid external to the second specified valve moves the second specified valve toward the position in which it obstructs passage of fuel through the orifice, and means for transmitting to the first and third specified means the higher of the pressure of the atmosphere and the pressure of the fluid in the duct on the engine side of the first specified pump.

4. In carbureting apparatus for internal combustion engines, a duct, a pump for moving air through the duct toward the engine, a pump with a by-pass through which fuel may return from the discharge to the intake side of the impeller of the second specified pump for advancing fuel to the engine, a valve which is movable toward and away from a position in which it obstucts the passage of fuel through the by-pass, means through which the pressure of fluid external to the second specified pump urges the valve toward the position in which it obstructs the passage of fuel through the by-pass, means, including an orifice, through which fuel is advanced by the pump to the engine, a valve which is movable toward and away from a position in which it obstructs the passage of fuel through the orifice, means through which the pressure of the fuel advanced by the second specified pump urges the second specified valve away from and the pressure of fluid external of the second specified valve moves the second specified valve toward the position in which it obstructs passage of fuel through the orifice, and means for transmitting to the first and third specified means the pressure of the fluid in the duct on the engine side of the first specified pump.

5. In carbureting apparatus for internal combustion engines, a duct, a pump driven at a speed which is variable with respect to the speed of the engine for moving air through the duct toward the engine, a pump driven at a speed proportionate to the speed of the engine for moving air from the duct on the engine side of the first specified pump toward the engine, means for metering fuel in accordance with the flow of air through the duct interposed in the duct on the atmospheric side of the first specified pump, means, including an orifice, through which fuel is introduced into the duct between the specified pumps, a pump for advancing fuel through the first specified means and the second specified means into the duct, a valve which is movable toward and away from a position in which it obstructs passage of fuel through the orifice, means through which the pressure of the fuel advanced by the third specified pump urges the valve away from and the pressure of fluid external to the valve urges the valve toward the position in which it obstructs passage of fuel through the orifice, and means for transmitting to the third specified means the higher of the pressure of the atmosphere and the pressure of the fluid in the duct between the first specified pump and the second specified pump, including a valve which communicates with the atmosphere and with the duct between the first specified pump and the second specified pump and includes a member movable by the difference between the pressures to a position in which it blocks communication between the atmosphere or the duct and the second specified valve.

6. In carbureting apparatus for internal combustion engines, a duct, a pump for moving air through the duct toward the engine, means, including an orifice, through which fuel is introduced into the duct, a pump for advancing fuel into the duct through the specified means, a valve which is movable toward and away from a position in which it obstructs passage of fuel through the orifice, means through which the pressure of the fuel advanced by the second specified pump urges the valve away from and the pressure of fluid external to the valve moves the valve toward the position in which it obstructs passage of fuel through the orifice, and means for transmitting to the second specified means the pressure of the fluid in the duct on the engine side of the first specified pump.

7. In carbureting apparatus for internal combustion engines, a duct, a pump for moving air through the duct toward the engine, a pump for advancing fuel to the engine, means through which fuel is advanced by the pump to the engine including an orifice, a valve which is movable toward and away from a position in which it obstructs the passage of fuel through the orifice, means through which the pressure of the fuel advanced by the second specified pump urges the valve away from and the pressure of fluid external to the valve moves the valve toward the position in which it obstructs passage of fuel through the orifice, and means for transmitting to the second specified means the higher of the pressure of the atmosphere and the pressure of the fluid in the duct on the engine side of the first specified pump.

8. In carbureting apparatus for internal combustion engines, a duct, a pump for moving air through the duct toward the engine, a pump for advancing fuel to the engine, means through which fuel is advanced by the pump to the engine including an orifice, a valve which is movable toward and away from a position in which it obstructs the passage of fuel through the orifice, means through which the pressure of the fuel advanced by the second specified pump urges the valve away from and the pressure of fluid external to the valve moves the valve toward the position in which it obstructs passage of fuel through the orifice, and means for transmitting to the second specified means the pressure of the fluid in the duct on the engine side of the first specified pump.

9. In carbureting apparatus for internal combustion engines, a duct, a pump driven at a speed which is variable with respect to the speed of the engine for moving air through the duct toward the engine, a pump driven at a speed proportionate to the speed of the engine for moving air from the duct on the engine side of the first specified pump toward the engine, means for metering fuel in accordance with the flow of air through the duct interposed in the duct on the atmospheric side of the first specified pump, means through which fuel is introduced into the duct between the specified pumps, a pump with a by-pass through which fuel may return from the discharge side to the intake side of the impeller of the third specified pump for advancing fuel through the first specified means and the second specified means into the duct, a valve which is movable toward and away from a position in which it obstructs the passage of fuel through the by-pass, means through which the pressure of fluid external to the third specified pump urges the valve toward the position in which it obstructs the passage of fuel through the by-pass, and means for transmitting to the third specified means the higher of the pressure of the atmosphere and the pressure of the fluid in the duct between the first specified pump and the second specified pump, including a valve which communicates with the atmosphere and with the duct between the first specified pump and the second specified pump and includes a member movable by the difference between the pressures to a position in which it blocks communication between the atmosphere or the duct and the second specified valve.

10. In carbureting apparatus for internal combustion engines, a duct, a pump for moving air through the duct toward the engine, means through which fuel is introduced into the duct, a pump with a by-pass through which fuel may return from the discharge side to the intake side of the impeller of the second specified pump for advancing fuel into the duct through the specified means by the pressure it applies to the fuel, a valve which is movable toward and away from a position in which it obstructs the passage of fuel through the by-pass, means through which the pressure of fluid external to the second specified pump urges the valve toward the position in which it obstructs the passage of fuel through the by-pass, and means for transmitting to the second specified means the pressure of the fluid in the specified duct on the engine side of the first specified pump.

11. In carbureting apparatus for internal combustion engines, a duct, a pump for moving air through the duct toward the engine, a pump with a by-pass through which fuel may return from the discharge side to the intake side of the impeller of the second specified pump for supplying fuel to the engine, a valve which is movable toward and away from a position in which it obstructs the passage of fuel through the by-pass, means through which the pressure of fluid external to the second-specified pump urges the valve toward the position in which it obstructs the passage of fuel through the by-pass, and means for transmitting to the first specified means the higher of the pressure of the atmosphere and the pressure of the fluid in the duct on the engine side of the first specified pump.

12. In carbureting apparatus for internal combustion engines, a duct, a pump for moving air through the duct toward the engine, a pump for advancing fuel to the engine, a valve which affects the introduction of fuel into the engine, means through which the pressure of fluid external to the valve alters the effect of the valve on the introduction of fuel into the engine, and means for transmitting to the first specified means the pressure of the atmosphere or the pressure of the fluid in the duct on the engine side of the first specified pump.

13. In carbureting apparatus for internal combustion engines, a duct, a pump for moving air through the duct toward the engine, a pump for advancing fuel to the engine, a valve which affects the introduction of fuel into the engine, means through which the pressure of fluid external to the valve alters the effect of the valve on the introduction of fuel into the engine, and means for transmitting to the first specified means the pressure of fluid at one point which is external to the valve or the pressure of fluid at another point with respect to the valve which is external to the valve.

14. In an internal combustion engine which includes a duct and a pump for moving air through the duct toward the engine, fluid transfer apparatus which includes a pump for advancing fluid with a by-pass through which the fluid may return from the discharge to the intake side of the impeller of the second specified pump, a valve which is movable toward and away from a position in which it obstructs the passage of the fluid through the by-pass, means through which the pressure of fluid external to the apparatus urges the valve toward the position in which it obstructs the passage of the fluid through the by-pass, means including an orifice through which the first mentioned fluid is advanced by the second specified pump, a valve which is movable toward and away from a position in which it obstructs the passage of the first mentioned fluid through the orifice, means through which the pressure of the first mentioned fluid urges the second specified valve away from and the pressure of fluid external to the apparatus moves the second specified valve toward the position in which it obstructs passage of the first mentioned fluid through the orifice, and means for transmitting to the first and third specified means the higher of the pressure of the atmosphere and the pressure of the air in the duct on the engine side of the first specified pump.

15. In an internal combustion engine which includes a duct and a pump for moving air through the duct toward the engine, fluid transfer apparatus which includes a pump for advancing fluid with a by-pass through which the fluid may return from the discharge to the intake side of the impeller of the second specified pump, a valve which is movable toward and away from a position in which it obstructs the passage of the fluid through the by-pass, means through which the pressure of fluid external to the apparatus urges the valve toward the position in which it obstructs the passage of the fluid through the by-pass, means including an orifice through which the first mentioned fluid is advanced by the second specified pump, a valve which is movable toward and away from a position in which it obstructs the passage of the first mentioned fluid through the orifice, means through which the pressure of the first mentioned fluid urges the second specified valve away from and the pressure of fluid external to the apparatus moves the second specified valve toward the position in which it obstructs passage of the first mentioned fluid through the orifice, and means for transmitting to the first and third specified means the pressure of the air in the duct on the engine side of the first specified pump.

16. In an internal combustion engine which includes a duct and a pump for moving air through the duct toward the engine, fluid transfer apparatus which includes a pump for advancing fluid, means including an orifice through which the fluid is advanced by the pump, a valve which is movable toward and away from a position in which it obstructs the passage of the fluid through the orifice, means through which the pressure of the fluid urges the valve away from and the pressure of fluid external to the apparatus moves the valve toward the position in which it obstructs passage of the first mentioned fluid through the orifice, and means for transmitting to the second specified means the higher of the pressure of the atmosphere and the pressure of the air in the duct on the engine side of the first specified pump.

17. In an internal combustion engine which includes a duct and a pump for moving air through the duct toward the engine, fluid transfer apparatus which includes a pump for advancing fluid with a by-pass through which fluid may return from the discharge side to the intake side of the impeller of the second specified pump, a valve which is movable toward and away from a position in which it obstructs the passage of fluid through the by-pass, means through which the pressure of fluid external to the apparatus urges the valve toward the position in which it obstructs the passage of fluid through the by-pass, and means for transmitting to the first specified means the higher of the pressure of the atmosphere and the pressure of the air in the duct on the engine side of the first specified pump.

18. In an internal combustion engine which includes a duct and a pump for moving air through the duct toward the engine, fluid transfer apparatus which includes a pump for advancing fluid, a valve which affects the advance of the fluid, means through which the pressure of fluid external to the apparatus alters the effect of the valve on the advance of the fluid, and means for transmitting to the first specified means the pressure of the atmosphere or the pressure of the air in the duct on the engine side of the first specified pump.

19. In fluid transfer apparatus, a pump for advancing fluid, a valve which affects the advance of the fluid, means through which the pressure of fluid external to the apparatus alters the effect of the valve on the advance of the first mentioned fluid, means for transmitting to the first specified means the pressure of fluid at one point which is external to the apparatus or the pressure of fluid at another point with respect to the apparatus which is external to the apparatus and at which the pressure of the fluid varies with respect to the pressure of the fluid at said one point, and valve means controlled by the fluid pressures from the two points whenever one of the fluid pressures predominates over the other for selecting the predominant one to transmit solely the predominant pressure to the first specified means by the second specified means.

MILTON A. TRISLER.

(References on following page)

REFERENCES CITED

The following references are of record in the file of this patent:

UNITED STATES PATENTS

| Number | Name | Date |
|---|---|---|
| 1,160,562 | Banner | Nov. 16, 1915 |
| 1,241,372 | Guyer | Sept. 25, 1917 |
| 1,363,470 | Knudsen | Dec. 28, 1920 |
| 1,413,419 | Moss | Apr. 18, 1922 |
| 2,000,721 | Standerwick | May 7, 1935 |
| 2,136,959 | Winfield | Nov. 15, 1938 |
| 2,146,184 | High | Feb. 7, 1939 |
| 2,170,530 | Johnson | Aug. 22, 1939 |
| 2,263,091 | Johnson | Nov. 18, 1941 |
| 2,310,984 | Mock et al. | Feb. 16, 1943 |
| 2,318,292 | Chandler | May 4, 1943 |
| 2,330,558 | Curtis | Sept. 28, 1943 |
| 2,398,619 | Clark et al. | Apr. 16, 1946 |

FOREIGN PATENTS

| Number | Country | Date |
|---|---|---|
| 113,026 | Australia | May 2, 1941 |
| 543,260 | Great Britain | Feb. 17, 1942 |
| 551,308 | Great Britain | Feb. 17, 1943 |